July 1, 1952
A. SAMOGGIA
2,601,817
PORTABLE STEREOSCOPIC CAMERA FOR THE PHOTOGRAPHY OF INVERTED IMAGES
Filed July 12, 1949
2 SHEETS—SHEET 1
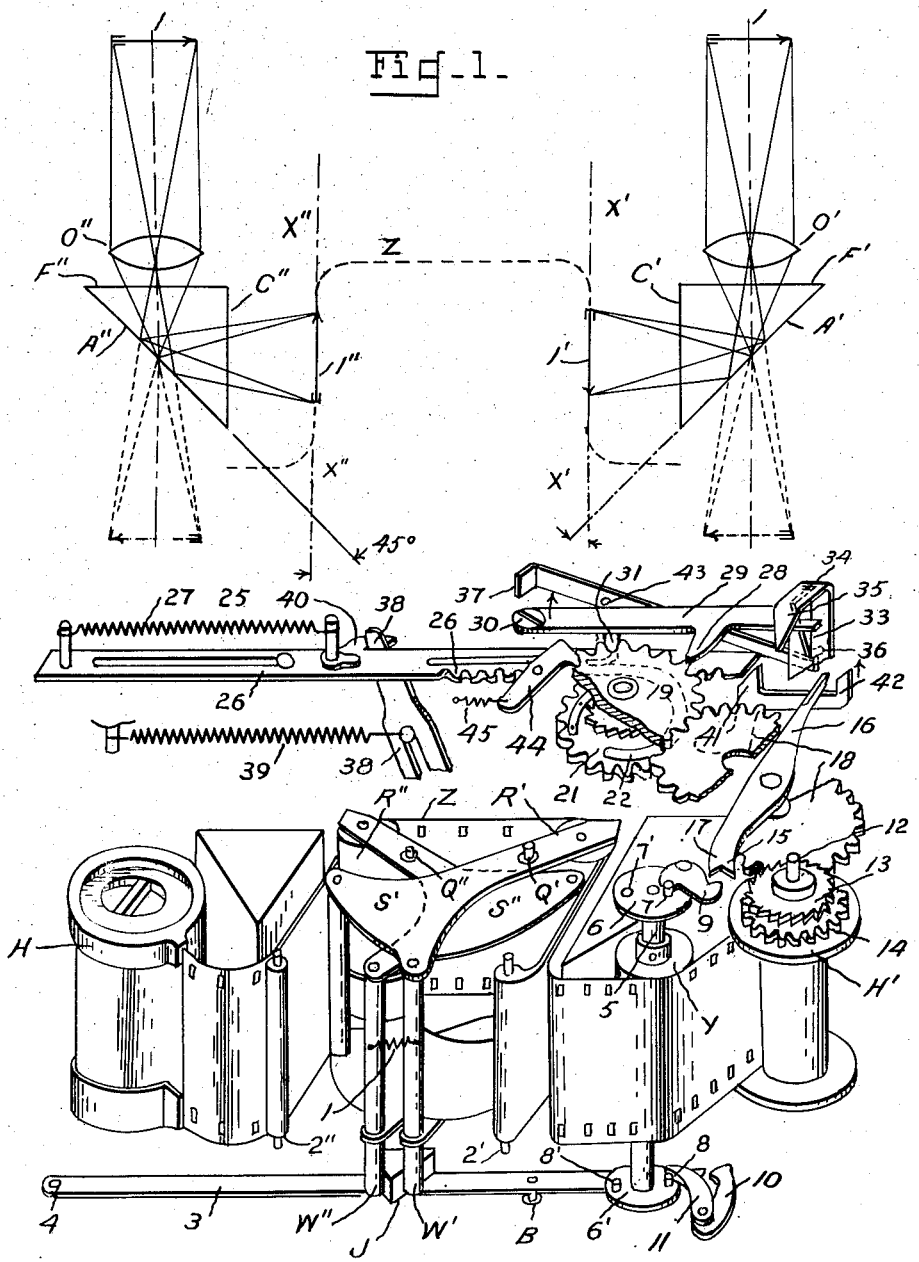
INVENTOR
Antonio Samoggia,
BY
ATTORNEY July 1, 1952  A. SAMOGGIA  2,601,817
PORTABLE STEREOSCOPIC CAMERA FOR THE
PHOTOGRAPHY OF INVERTED IMAGES
Filed July 12, 1949  2 SHEETS—SHEET 2
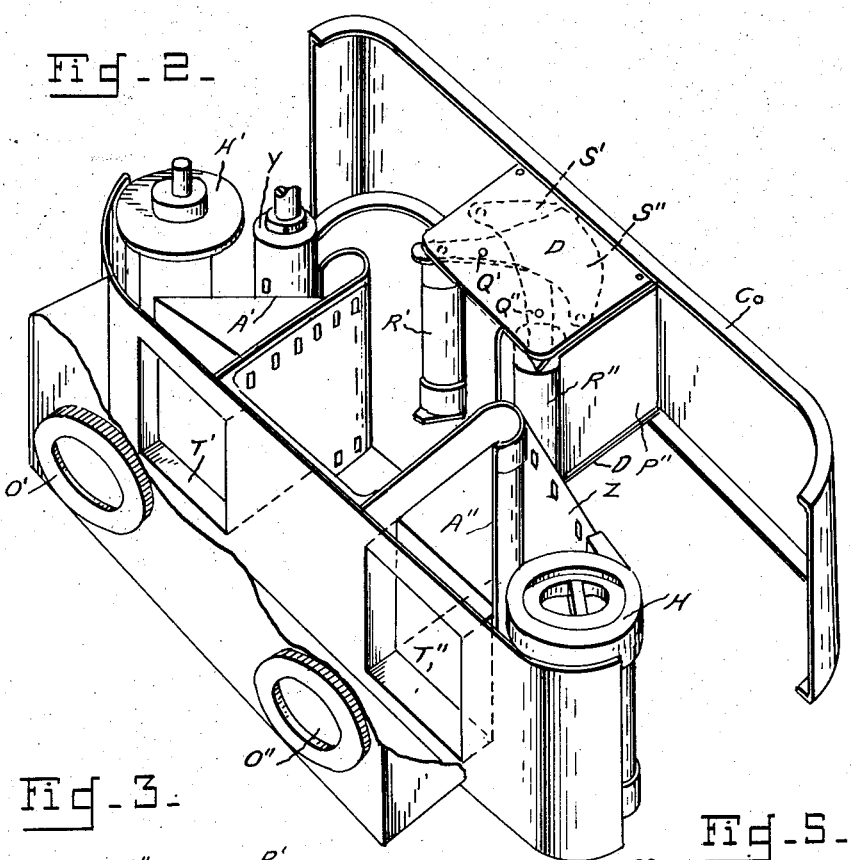
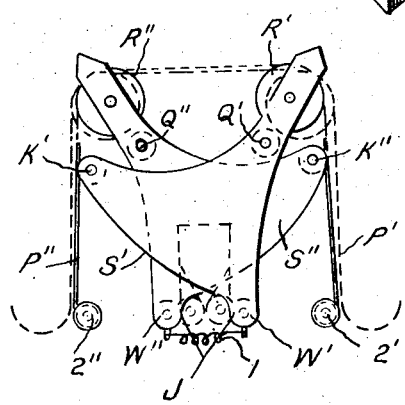
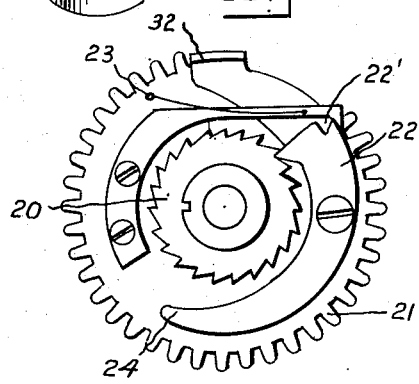
INVENTOR
Antonio Samoggia,
BY 
ATTORNEY Patented July 1, 1952

2,601,817

UNITED STATES PATENT OFFICE 2,601,817

PORTABLE STEREOSCOPIC CAMERA FOR THE PHOTOGRAPHY OF INVERTED IMAGES

Antonio Samoggia, Bologna, Italy

Application July 12, 1949, Serial No. 104,266

4 Claims. (Cl. 95—18)

This invention relates to portable stereoscopic cameras of the type including a pair of objectives, behind each of which a reflector is fitted which directs the images towards a central chamber wherein a film is passed across the walls of the chamber and is exposed through openings therein. These stereo cameras produce inverted stereo pictures which therefore need not be transposed or inverted after their development.

The principal object of the invention is to provide a camera of the kind above referred to which is small and compact, easy to load and unload, in which the advancement of the film is perfectly regular and which, if desired, may be employed as a normal non-stereoscopic or single exposure camera.

Another object of the invention is to provide a camera of the kind above referred to, which is provided with an outer control means which, when the shutter is snapped, permits of loosening the film from the focal planes against which it is automatically pressed before its exposure at the end of its forward movement.

Still other objects and advantages which render the binocular camera a very compact, handy and reliable photographic instrument will be better understood by the following specification of a preferred embodiment of a stereoscopic camera, when read in connection with the attached drawing, in which:

Figure 1 is a diagrammatic view of the optical device for inverting the images in a stereoscopic camera or in a stereoscope for viewing uninverted pictures;

Figure 2 is an exploded view in perspective of a stereoscopic camera with parts broken away for illustration of the interior;

Figure 3 is a fragmentary diagrammatic view of the device for guiding and pressing the film against the ray-inverting prisms;

Figure 4 is a fragmentary view in perspective of the mechanism for guiding the film coupled with the film-feeding and shutter-loading mechanism.

Figure 5 is a plan view of a detail of the mechanism for connecting the shutter-loading rack to the film-shifting devices.

Referring particularly to Fig. 1, O' and O" are the objectives of a stereoscopic camera, which are spaced apart within the range of 57 to 65 cm. and preferably of about 64 cm. Two mirror surfaces A', A" are respectively interposed in the optical paths of the objectives at an angle of 45° to the optical axis of the respective objective and also to the exposure planes X'—X' and X"—X", which are parallel and between the mirror surfaces A'—A" to produce inverted images I'—I" which may be focused on said exposure planes by any known means capable of simultaneously shifting said objectives along their optical axes.

Along said parallel planes X'—X' and X"—X" pass the two sections of film Z which, as may be seen from Figures 1 to 4, passes from roll H to roll H', both rolls being fitted in magazines provided in the spaces left free behind the inclined mirror surfaces and is guided along an U-path. This U-bending of the film is obtained in practice by providing in the casing a U-shaped cavity between the two mirrors, having walls whose edges project beyond the mirror edges and in the cover a projecting film guide including a pair of rollers R'—R" each of which is idly journalled in the apices of a pair of parallel triangular levers S'—S" which are fulcrumed immediately adjacent said rollers on pivot pins Q'—Q" journalled between plates D projecting forwardly from the rear camera cover Co. The length of the film between each pair of exposure area is equal to the height of two pictures.

Two smaller rollers K'—K" are journalled on another of the apices of said triangular levers S'—S" and are movable against the U-path opposite rollers R' and R". Two pins W'—W" are mounted on the third apex of said triangular levers and are connected by a spring I which pulls them toward each other. Two small plates P'—P" are mounted between plates D on pivots 2'—2" and these plates are pressed by the rollers K"—K" against the film sections to be exposed.

Pins W' and W" may be pushed apart against the action of spring I by wedge J which may be operated from the exterior by the means which will be described hereinafter.

By pushing pins W' and W" apart, rollers R'—R" and K'—K" are moved towards each other, thus releasing the pressure on the film.

Wedge J is fitted on lever 3 fulcrumed at 4 to a fixed part of the camera. Lever 3 may be controlled by hand from the exterior by button B. In practice, however, this button serves only for freeing the film in order to feed a new section thereof, after each snapshot.

The feeding of the film by a section having the length of two pictures (or also of a single one, as will be seen hereinafter) so as to avoid partial or total superposition of pictures is effected as follows:

The film roll introduced into magazine H passes along the described devices which guide same along a U-path, and, after having passed the second wing of the U, before rolling on winding spool H' engages by means of its marginal perforations the rows of teeth on drum Y. The number of teeth in each row is equal to the number of perforations in a film section of a length equal to two pictures. Drum Y is shiftably keyed on shaft 5 so as to rotate therewith, although having limited axial movement thereon. The shaft 5 is mounted in bearings (not shown) fastened to the camera casing.

The shaft 5 carries at its ends two disks 6, 6' each of which is provided with two diametrically opposite pins 7, 7' and 8, 8'. Pins 7 and 7' engageable by the shaped tail of a hook tooth 9 fulcrumed to a fixed part of the camera and under the action of a spring (not shown). On the other hand, pins 8 and 8' engageable by a shaped arm 11 coupled to another arm terminating in a hook 10. The parts 10 and 11 lie in two different planes and are pivoted on a common pivot supported by a rigid part of the camera and are biased by a spring, not shown. Hook 10 is adapted to engage, under the action of said spring, the free end of lever 3. A ratchet wheel 13 and a gear wheel 14 are keyed on pivot 12 of the winding spool. A lever 16, fulcrumed on a fixed part of the camera, has a pawl tooth 15 at one end which is biased towards ratchet wheel 13. The lever 16 also has a small tooth 17, adjacent the pawl tooth 15, which is usually engaged by hook 9.

The film-feeding device is connected with the shutter-loading mechanism in order to avoid picture superpositioning. This connection is preferably effected as follows:

Gear wheel 14 is connected through a gear train or other transmission (diagrammatically shown by gear 18) to gear 19 integral with a ratchet wheel 20. These two wheels are mounted upon a pivot pin on which a gear 21 is idly mounted. This gear 21 carries a pawl 22 whose tooth is pushed between the ratchet wheel teeth by a spring tooth 23 snapping into a notch 22' of pawl 22 (Fig. 5), when a nose 25 on rack 26 meshing with gear 21 bears against the projecting end 24 of pawl 22. Rack 26 is pulled into rest position by spring 27 while ratchet wheel 19 may freely rotate only in the shutter-loading direction and is stopped always in positions in which the tooth of pawl 22 comes between two ratchet teeth.

Wheel 19 can be engaged in its turn by tooth 28 of a lever 29 fulcrumed at 30 to a fixed part of the camera, and is pulled away from wheel 19 by a spring (not shown). Lever 29 carries also a nose 31 which can abut against the end 32 of pawl 22 (Fig. 5). The free end of lever 29 is pushed by said spring against a wedge 33 controlled by a release button or trigger (not shown). Integral with wedge 33 a stirrup 34 is provided which on one end ends with a wedge-shaped part 35 and on the other end carries a pin 36. Wedge 35, which for the sake of clearness of drawing, has been drawn in a higher position, than it is really, is such that, when it is pressed downwardly, abuts against the tail of the two-armed lever 16. A release lever 43, fulcrumed on a fixed part of the camera, is biased by a spring (not shown) for abutment by one end against pin 36 and the other end 37 is bent at right angles for catching the end 38 of the shutter-loading lever, which is pulled by spring 39, said end 38 being engageable with hook 40 of rack 26. One end of rack 26 is wedge-shaped and in its path is a pawl provided with two teeth 41 and 42. This pawl is fulcrumed on a fixed part of the camera and is drawn towards rack 26 by a spring (not shown), tooth 42 being movable into the path of the tail of two-armed lever 16.

The foregoing elements are those which might be considered as indispensable in a stereoscopic camera based on the above principles, as they:

(1st) Enable pressing two film sections at the two sides of the U-path, without pulling same from both sides of the U and permit of releasing the film when this release is necessary;

(2nd) Enable feeding the film the exact length of one or two pictures, as the case may be, thus avoiding the partial superposition of or wasted space between pictures.

(3rd) Avoids double exposure by loading the shutter at the same time the film is fed.

(4th) Enables alternative use as a binocular or single-objective camera.

These advantages will be apparent from the following description of the operation.

*Loading of the camera.*—After having removed the cover Co, a usual motion picture-sized film roll H is inserted into the usual magazine and the end of the film roll is fastened, as usual, to the winding spool H'.

Then, by operating button B, the free end of lever 3 is caused to be held by tooth 10. The cover Co is closed and thus the film is bent in U-shape and engages with its perforations the double row of teeth on drum Y.

*Film release.*—Once the cover is closed, wedge J is engaged between pins W' and W'' and pushes same apart, against the action of spring I. Pins W'—W'', by moving apart, swing levers S' and S'' a few degrees on pivot pins Q', Q'' and consequently rollers R'—R'' and K'—K'' are pushed together and plates P'—P'', Fig. 3, are released from bearing against the film sections adjacent thereto. Thus the film is allowed to slide freely.

*Shutter loading.*—Once the cover is closed, by rotating spool H' in its feeding direction, the film is advanced by causing drum Y to rotate. Thus gear 14, fixed with said drum, is rotated and drives gear 18, which drives gear 19 and ratchet wheel 20. As pawl 22 engages ratchet wheel 20, through gear 21 is also driven and in turn drives rack 26. This rack, by sliding, permits, through its tooth 40, the angular movement of load lever 38, through its spring 39, and is drawn by tooth 40 until said lever passes over and is held by bent arm 37 of release lever 43.

Successively to said movements, nose 25 of rack 26 abuts the end 24 of pawl 22 (Fig. 5) and, against the spring action, disengages said pawl from the ratchet teeth, whereby the spring tooth 23, by sealing in notch 22' of pawl 22, holds the pawl disengaged from ratchet wheel 20. Under these circumstances, gear 21 is idle and is brought to rest position by rack 26 pulled by spring 27.

In this position the end 32 of pawl 22 is located in front of nose 31 of lever 29, the shutter lever 38 is retained by arm 37 of lever 43 and rack 26 and hook 40 are biased by spring 27 to release load lever 38.

*Film stopping.*—In order to understand the operation of the film stopping devices it is necessary to consider that, during the first step of the shutter loading, by the action of the wedge end of rack 26 abutting pawl tooth 41, tooth 42 is lowered under the end of lever 16 which being pushed by its spring, rotates until its tooth 17 abuts pawl 9. In these conditions, ratchet wheel 13 can rotate until one of the pins 7 or 7' abuts the tail of pawl 9 and disengages the hooked end thereof from tooth 17 of lever 16 whereupon pawl tooth 15 is pushed between the teeth of ratchet wheel 13 and prevents a further rotation of drum H', thus stopping the film feeding.

Shortly before the film is stopped, one of the pins 8 or 8', by abutting arm 11, promotes the rotation of release hook 10 which leaves the end of lever 3 free to swing. Thus pins W'—W'', being pulled together by spring 1, eject wedge J and rollers K'—K'' and plates P'—P'' are pushed apart and press the film sections to be exposed against the film guides and into the focal planes.

In their rotation, pins 8'—8'' move relative to pins 7—7' at such an angle as to cause arm 11 to return to its rest position before hook 9 frees tooth 17, that is before the film feed is stopped, so that after the shutter is released lever 3 may be held by tooth 10.

If the camera is designed in such a manner that the film length between each pair of picture areas is equal to the length of two pictures, the whole film, with the exception of the second picture, will be exposed.

This is obtained by providing on drum Y two rows of teeth with the number in teeth of each row equal to the number of perforations in a film length equivalent to two picture areas.

By providing on disk 6 a pin 7' in a position diametrically opposite to pin 7 and on disk 6' a pin 8' diametrically opposite to pin 8 and by shifting by any suitable means (not shown) in axial direction the journal which carries both disks 6 and 6', the film feed may be stopped at each half turn of drum Y, that is at each single picture length of film.

This latter possibility may be utilised whenever the camera is to be used as a single-objective camera, in which case the means for axially shifting said disks may also actuate some means for leaving one of the shutters closed or otherwise for shutting one of the objectives.

*Shutter operation.*—In order to permit feeding the film after taking a picture, the following devices are provided:

It should be borne in mind that the film is stopped each time pawl tooth 15 engages ratchet wheel 13.

By pushing on release 34, the following operation takes place:

(1st) Pin 36, by acting on lever 43 lifts arm 37 which frees the shutter release.

(2nd) Wedge 35 is lowered and abuts the end of lever 16 thus causing same to rotate beyond pawl end 42 when pin 7 has disengaged tooth 9 from tooth 17 and tooth 41 has been shifted by the end of rack 21 during the loading operation.

(3rd Wedge 33 causes lever 29 to rotate about pivot 30 thus pushing nose 31 against the end 32 of pawl 22. Spring end 23 is thereby withdrawn from notch 22' whereupon the tooth of pawl 22 engages ratchet wheel 20 and couples wheels 19 and 21 together, which permits a new shutter-loading cycle.

Pawl 44 and nose 28 ensures that wheel 20, coupled to wheel 19 and having the same number of teeth as the latter, presents to said pawl a space between two teeth.

While the above described devices are thought to be those that are essential for a stereoscopic camera according to the invention, other devices, which are not peculiar of this camera have been omitted, as they do not form a part of the invention.

Of course, the invention may undergo numerous changes. Thus the prisms could be replaced by mirrors and the other devices described could be replaced by equivalent means, though remaining within the spirit of the invention.

It is also apparent that the optical part of the device could be employed for examining uninverted stereoscopic pictures taken by usual binocular cameras.

In fact, if the objectives of the described camera are replaced by a pair of oculars and, in place of the focal planes, two diffusing surfaces are provided, the pictures will be inverted by the device and stereoscopic vision will ensue.

I claim:

1. A stereoscopic camera comprising a casing having a removable cover, a pair of spaced objectives with shutters in said casing, a pair of plane mirror surfaces fitted behind said objectives and forming an angle of 45° with the optical axis of the respective objective, parallel plates having exposure openings positioned between and in focussing relation with said inclined mirrors, film roll magazines at each end of the casing behind the inclined mirrors, guide means for directing the film from one roll to the other, mirrors in a central cavity of the casing having parallel walls extending beyond the mirror edges and lying in correspondence of the openings constituting the focal planes, whereby the means for keeping the film section between the rolls guided along a U-path is constituted by a frame fitted to the cover of the camera and comprising a pair of plates snugly fitting within said U-shaped cavity of the camera casing, a pair of parallel triangular levers mounted between said plates so as to cross each other on pivot pins fitted in a position somewhat behind one of the apices of said triangular levers, rollers mounted in proximity to said pivot pins, in proximity to the apices of said levers, rollers mounted by another of the apices of said triangular levers in such a position as to come to lie with their peripheries in line with the first-named rollers mounted on the other lever, movable plates fitted between the apertured plates against which the film sections to be exposed bear, and said rollers mounted on said lever pairs, pins mounted by the third apex of said levers, spring means pulling said pins together, wedge means mounted so as to be shifted between or out of said pin pairs and means for shifting said wedge means between or out of said pin pairs.

2. In a stereoscopic camera of the kind comprising a casing provided with a pair of objectives provided with shutters, a pair of plane mirror surfaces fitted behind said objectives and forming an angle of 45° with the optical axis of the respective objective, plates provided with an opening having the size of a picture fitted in parallel relation in such a position as to permit of focussing thereon the pair of pictures projected by the objectives against the mirrors, two magazines for film rolls, and a cover for said casing, the arrangement of means for causing the film to be advanced in predetermined lengths and comprising a drum provided with a double row of teeth aligned and spaced like the film perforations, the number of said aligned teeth in each row being equal to or multiple of the number of perforations existing on a picture of the film, a journal slidably mounted coaxially of said journal but rotating therewith, fixed disks or plates fitted at the ends of said journal, diametrically opposed pins having different lengths projecting parallelly of the axes of said disks, a spring pawl provided with a hooked end and provided with an opposite or tail end without a hook, mounted by one of said disks in such a position as to abut with its tail end against one or both of said pins, a double armed pawl under the action of a spring, formed at one of its ends with a tooth and an adjacent notch in such a position as to be hooked by the hooked end of said first-named pawl and means for rotating said toothed drum so as to bring one of the pins carried by said disks to abut against the tail end of the first-named pawl and to cause same to be disengaged from the second-named pawl, a ratchet wheel fastened to the film-winding spool shaft in such a position as to be engaged by the tooth at the notched end of said double-armed pawl and means for shifting said toothed drum journal.

3. In a stereoscopic camera of the kind comprising a casing provided with a pair of objectives provided with shutters, a pair of plane mirror surfaces fitted behind said objectives and forming an angle of 45° with the optical axis of the respective objective, plates provided with an opening having the size of a picture fitted in parallel relation in such a position as to permit of focussing thereon the pair of pictures projected by the objectives against the mirrors, two magazines for film rolls, and a cover for said casing, the arrangement of the two magazines at the ends of the camera, in the space left free behind the inclined mirror surfaces, guide means for causing the film passing from one roll to the other, mirrors in a central cavity of the camera having parallel walls extending beyond the mirror edges and lying in correspondence of the openings constituting the focal planes, whereby the means for keeping the film section between the rolls guided along a U-path is constituted by a frame fitted to the cover of the camera and comprising a pair of plates snugly fitting within said central cavity of the camera casing, a lever carrying a wedge, a pair of triangular levers carrying means for pressing the film sections against the focal planes, pins on one of the apices of said levers pulled together by a spring, and means for pushing said wedge between said pins so as to push same apart, a double armed pawl provided with a hooked end mounted in proximity to the free end of said lever, a toothed drum having the teeth positioned and spaced so as to engage the perforations of said film, a journal for said drum slidably mounted therethrough, a pin-carrying disk at the end of said journal and in proximity to the hooked end of said double pawl, the whole being so arranged that, when one of the pins of said disk abuts against a part of said pawl, disengages the hooked part from said wedge-carrying lever end and permits of said wedge coming out of said pin pairs carried by said triangular levers.

4. In a stereoscopic camera of the kind comprising a casing provided with a pair of objectives provided with shutters, a pair of plane mirror surfaces fitted behind said objectives and forming an angle of 45° with the optical axis of the respective objective, plates provided with an opening having the size of a picture fitted in parallel relation in such a position as to permit of focussing thereon the pair of pictures projected by the objectives against the mirrors, two magazines for film rolls, and a cover for said casing, the arrangement of means for promoting the loading of the shutters when the film is being fed through the camera and comprising a toothed wheel or gear rotating together with the shaft of the film-winding spool, a transmission connecting this gear with another gear, a spring-pressed pawl engaging this wheel and stopping same in a particular position, a ratchet wheel co-axially of said first-named gear and rotating therewith, a ratchet wheel co-axially of said second-named gear and rotating therewith, a third gear wheel co-axially of said second-named gear but rotatable independently therefrom, means for coupling the third-named gear to the second-named ratchet wheel, a rack meshing with said third-named gear, a spring for pulling said rack into an end position opposite to the forward or feeding movement of the film, a swingable nose fitted to the rack, a shutter-loading rod held by a spring into a hook-shaped part of said rack, guide means for said rack, a pawl provided with a pair of teeth one of which can abut against one end of said rack, a double-armed pawl adapted to abut against the second tooth of said first-named two-teeth pawl, a spring pushing said two-armed pawl into engagement with the ratchet teeth of the ratchet wheel fitted to the film spool shaft, means for shifting said two-armed pawl away from said ratchet wheel integral of said film spool, means connected with the shutter release for releasing said shutter-loading lever, means for registering the second-named gear in respect of the adjacent ratchet wheel, means for coupling the rack-control gear to the second-named ratchet wheel and a spring pulling the two-armed pawl away from its ratchet wheel.

ANTONIO SAMOGGIA.

REFERENCES CITED

The following references are of record in the file of this patent:

UNITED STATES PATENTS

| Number | Name | Date |
|---|---|---|
| 1,829,332 | Beck | Oct. 27, 1931 |
| 2,298,586 | Phillips | Oct. 13, 1942 |

FOREIGN PATENTS

| Number | Country | Date |
|---|---|---|
| 473,500 | Germany | Mar. 15, 1929 |
| 568,055 | Germany | Jan. 13, 1933 |